UNITED STATES PATENT OFFICE.

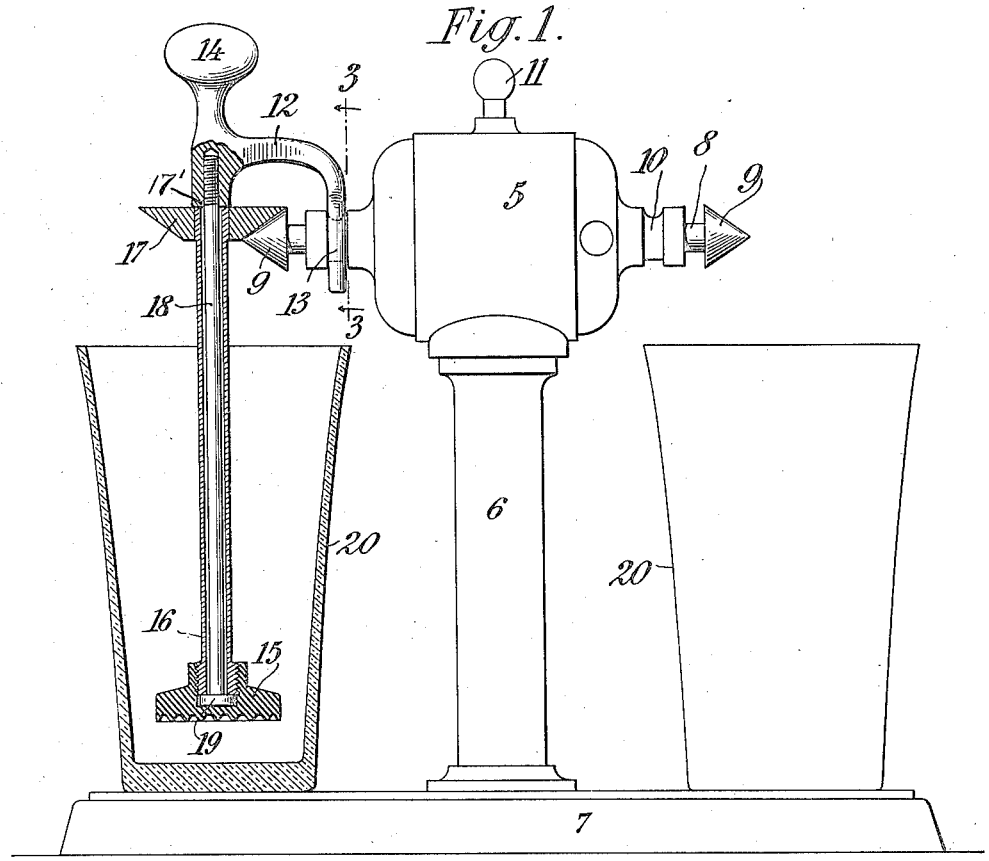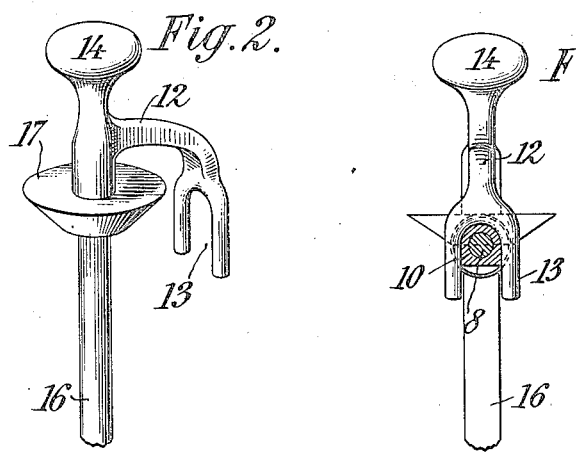

WILLIAM GENTRY SHELTON, OF NEW YORK, N. Y.

OPERATING DEVICE FOR MIXING-MACHINES.

1,238,834.

Specification of Letters Patent.

Patented Sept. 4, 1917.

Application filed May 21, 1917. Serial No. 169,812.

*To all whom it may concern:*

Be it known that I, WILLIAM GENTRY SHELTON, a citizen of the United States of America, residing in the borough of Manhattan, city, county, and State of New York, have invented certain new and useful Improvements in Operating Devices for Mixing-Machines, of which the following is a specification.

This invention relates to machines having interchangeable tools and particularly to small motor machines of this character. One employment of machine is that for mixing materials, preferably liquids and the like in small quantities, and in this employment is adapted for use as a drink mixer, the object of the invention being to provide a device of this character wherein the tool or working element may be bodily removed from the driving motor when occasion demands, as, for instance, in a drink mixer for applying the agitator to and removing the same from the receptacle containing the drink and also for the purpose of permitting the cleansing of the agitator. As applied to a drink mixer the invention also provides a mixing element which is a self-contained structure. The various features of the invention are described particularly in connection with and by reference to the accompanying drawings.

In the drawings accompanying this specification,—

Figure 1 represents a practicable embodiment of my invention designed for use as a drink mixer, the device being shown partly in elevation and partly in central vertical section;

Fig. 2 is a perspective view of the upper portion of the mixing or agitating element, and Fig. 3 is a section taken on a plane at about the line 3—3 of Fig. 1, looking toward the left.

In mixing machines, particularly those used in connection with drinks dispensed at soda water fountains and those used with malted milk and with egg components, it is quite desirable that the portion of the mixer which comes in contact with the material being mixed should be capable of being frequently cleansed. In connection with malted milk beverages this is particularly desirable since at times an egg is added to the drink, and various flavors having diversity of colors are added to the drinks, thus making it quite essential that the mixer be entirely free from any portion of the previous mixture before a new mixing is started. To this end the mixer is so constituted relatively to its motor that it may be removed therefrom, and the mixer itself is so constructed that it readily adapts itself to quick washing. The motor herein illustrated is assumed to have sufficient driving power to operate the mixers. The casing 5 of the motor is shown supported on a column 6 fast with a base 7 which is adapted to rest upon the counter or table where the mixing is to take place. The motor shaft 8 is shown disposed in a substantially horizontal position and as projecting from the opposite ends of the motor casing. This shaft is shown provided at each end with a conical friction driver or pulley 9. The hub of the casing is shown provided with a reduced neck portion 10 preferably flattened on the sides. This neck portion on each side is located inwardly of the driving pulley 9. Current is assumed to be supplied to the motor from some suitable source, and the starting and stopping of the motor to be controlled by some convenient means, as by means of a lever 11 adapted to make and break the circuit, as desired.

The mixer proper or mixing element is shown as a self-contained structure adapted to be readily engaged and disengaged from the driving portions of the device. This mixer is shown as comprising a frame portion 12 having a forked end 13 adapted to engage the neck 10, the arms of the fork being adapted to closely engage the flattened sides of such neck and the front and back of the fork to engage the shoulders which outline such neck. The frame is shown provided with a suitable handle, illustrated in the form of a knob 14. This knob is preferably heavy for the purpose of holding the frame in position on the motor casing and the tool to its work. The frame is normally stationary during the mixing operation, and the moving element comprises an agitator, preferably in the form of a button 15, having screwthreaded connection with the lower end of a sleeve 16, such sleeve having fast with its upper end a friction wheel 17 adapted to contact with the driving pulley 9 and coöperate therewith in the rotation of the mixer.

In practice I have found a suitable quality of cork to be a desirable material for the driving pulley 9, the coacting driver 17 being made of some suitable material, preferably metal, to coact therewith, and made of some material which will not readily become tarnished or corroded by the action of the various materials with which it comes in contact in use and when it is being cleansed. The rotary element of the mixer is shown mounted upon a spindle or arbor 18 having screwthreaded connection with the frame 12 and practically rigid therewith. The spindle 18 is shown provided at its lower end with a head 19 adapted to engage the lower end of the sleeve 16 and to support the same.

By reference to the drawings it will be seen that a small oil chamber is left between the sleeve 16 and the spindle 18, and that the upper end of the driven pulley 17 engages a shoulder 17' at the lower end of the frame 12, thereby keeping the oil in position, whereby a single filling of oil and adjustment of the device will last for a long time. The agitator 15 is preferably of closed construction so that it completely surrounds and protects the head 19 and the end of the sleeve 16, and completely closes the oil chamber so that no oil may escape and contaminate the material being mixed.

The base 7 is shown of sufficient size to support two containers 20, preferably, according to the prevailing practice of dispensing drinks, made of glass. Either or both of the mixers may be operated at the same time. The operator, if he desires, may start mixing a drink at the left-hand side of the apparatus, and before that is completed start mixing another at the right-hand side and then discontinue the mixing at the left, as occasion demands.

The parts are sufficiently proportioned so that the agitator 15 extends a suitable distance within the container and is supported at a suitable distance from the bottom thereof for the use to which it is to be put.

The operation of the device is substantially as follows: The operator places the material to be mixed in one of the containers 20, for instance the one at the right-hand side of the illustration, and places this upon the base 7. He then takes hold of the handle 14 of a clean mixer, inserts the agitator 15 in the container, and causes the forked end 13 to engage the neck 10, which then brings the driving and the driven members 9 and 17 into frictional engagement and in the position shown at the left-hand side of the device. The operator then moves the lever 11 and establishes a circuit, whereupon the agitator is driven in the manner above-described. After the mixing operation is completed the operator either shuts off the current or permits it to remain on, as his convenience may demand, and removes the mixing element from the motor element. The mixing element may immediately be thrown into a bath for its cleansing, or laid aside for the attention of some other attendant. In the quick serving of drinks it may also be found desirable to keep a supply of clean mixers on hand for the use of the operator, and have the cleansing of the used mixers attended to by some other person.

Although but one form of the invention is here illustrated and particularly described, yet it will be apparent that changes may be made within the scope of the claims without departing from the spirit of the invention.

I claim:

1. The combination with a frame having means for detachably engaging a support, of a spindle carried by the frame, a sleeve mounted upon such spindle and adapted to carry a tool, and a friction driving wheel fast with the said sleeve.

2. The combination with a friction driving pulley, of a frame adapted to be detachably supported adjacent said pulley, a tool carried by such frame, and a friction driving pulley fast with such tool and adapted to engage the said driving pulley.

3. The combination with a friction driving pulley, of a tool, a driven pulley connected to such tool, a frame carrying the said tool, and means for detachably supporting the frame with said tool in its operative position and the said pulleys in frictional engagement.

4. The combination with a motor provided with a casing, and a shaft, and a friction driving pulley mounted on said shaft, said casing being provided adjacent the pulley with a hub having a neck provided with flat sides, of a device comprising a tool frame having a forked end for engaging the said neck and carrying the tool, and a driven wheel fast with the said tool and adapted to engage the said driving wheel when the said frame is in position on the said neck.

5. The combination with a motor having a substantially horizontal shaft and provided with extending ends, and a friction driving pulley mounted on each such shaft end, of a pulley device comprising a work-performing element, and a driven pulley fast therewith, and means for interchangeably supporting the said device with the said driven pulley in engagement with the driving pulley at either end of the said motor shaft.

6. In a drink mixer, the combination with a motor having a casing, the motor being provided with a substatially horizontal shaft extending from the opposite ends of the said casing, and a friction pulley mounted on each end of the shaft, of a driven element and a driven pulley fast therewith, and means for interchangeably supporting the said driven element on the motor casing with the driven pulley in engagement with the driving pulley at either end of the said motor shaft.

7. The combination with a work holder, a casing mounted adjacent thereto, an electric motor in said casing and provided with a shaft, and a friction driving wheel mounted upon said shaft, the casing adjacent said pulley being provided with a hub having a neck provided with flattened sides, of a frame, a spindle carried by the frame, a sleeve surrounding the said spindle, a tool carried by the outer end of said sleeve, and a driven wheel carried by the inner end of the said sleeve adapted to engage the said driving wheel, the frame having a forked end for engaging the said neck and adapted to maintain its position thereon by gravity and hold the said wheels in driving engagement, and the tool in working position in relation to the work holder.

8. A mixer comprising a frame having means for engaging a support, a spindle carried by such frame and having a head at its free end, the frame being provided adjacent the spindle with a shoulder, a sleeve mounted upon said spindle and located between the head and the said shoulder, a pulley mounted upon the sleeve adjacent the said face, and a work performing member carried by the sleeve and incasing the said head.

In witness whereof, I have hereunto signed my name.

WILLIAM GENTRY SHELTON.